(12) United States Patent
Hedtke et al.

(10) Patent No.: US 7,702,478 B2
(45) Date of Patent: Apr. 20, 2010

(54) PROCESS CONNECTION FOR PROCESS DIAGNOSTICS

(75) Inventors: Robert C. Hedtke, Young America, MN (US); David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 565 days.

(21) Appl. No.: 11/364,877

(22) Filed: Feb. 28, 2006

(65) Prior Publication Data
US 2006/0212139 A1 Sep. 21, 2006

Related U.S. Application Data

(60) Provisional application No. 60/656,994, filed on Feb. 28, 2005.

(51) Int. Cl.
*G01F 1/12* (2006.01)
(52) U.S. Cl. .................................................. 702/100
(58) Field of Classification Search ................ 702/100, 702/104; 240/408; 28/217; 204/408
See application file for complete search history.

(56) References Cited

U.S. PATENT DOCUMENTS

| | | | | |
|---|---|---|---|---|
| 3,410,779 A | * | 11/1968 | Whitehead, Jr. et. al. .... | 204/408 |
| 3,964,296 A | | 6/1976 | Matzuk ........................ | 73/67.5 |
| 4,043,008 A | * | 8/1977 | Weiss et al. .................. | 28/271 |
| 4,083,031 A | | 4/1978 | Pharo, Jr. .................... | 367/135 |
| 4,355,536 A | | 10/1982 | McShane et al. ............. | 73/633 |
| 4,383,443 A | | 5/1983 | Langdon ...................... | 73/290 |
| 4,390,321 A | | 6/1983 | Langlois et al. .............. | 417/15 |
| 4,393,711 A | | 7/1983 | Lapides ........................ | 73/592 |
| 4,423,634 A | | 1/1984 | Audenard et al. ............. | 73/587 |
| 4,446,741 A | | 5/1984 | Sirokorad et al. ............. | 73/654 |
| 4,448,062 A | | 5/1984 | Peterson et al. .............. | 73/86 |
| 4,536,753 A | | 8/1985 | Parker .......................... | 340/566 |
| 4,641,529 A | | 2/1987 | Lorenzi et al. ................ | 73/601 |
| 4,696,191 A | | 9/1987 | Claytor et al. ................ | 73/600 |
| 4,895,031 A | | 1/1990 | Cage ............................ | 73/1.355 |
| 5,014,543 A | | 5/1991 | Franklin et al. ............... | 73/40.5 |
| 5,051,743 A | | 9/1991 | Orszulak ...................... | 340/870.04 |
| 5,369,674 A | | 11/1994 | Yokose et al. ................. | 376/245 |

(Continued)

FOREIGN PATENT DOCUMENTS

CN 1 257 179 A 6/2000

(Continued)

OTHER PUBLICATIONS

"Invitation to Pay Additional Fees" PCT/US2004/031678.

(Continued)

*Primary Examiner*—Tung S Lau
*Assistant Examiner*—Xiuquin Sun
(74) *Attorney, Agent, or Firm*—Westman, Champlin & Kelly, P.A.

(57) ABSTRACT

A process coupling for coupling a diagnostic device to process fluid of an industrial process includes a process interface configured to physically couple to the process fluid. A fluid pathway extending from the process interface configured to couple a process interface element of the process device to the process fluid. The fluid pathway is configured to optimize transmission of process noise from the process fluid to the process device for use by the diagnostic device.

26 Claims, 5 Drawing Sheets

U.S. PATENT DOCUMENTS

| | | | |
|---|---|---|---|
| 5,372,041 A | 12/1994 | Yoshida et al. | 73/14.31 |
| 5,471,884 A | 12/1995 | Czarnocki et al. | 73/720 |
| 5,497,661 A | 3/1996 | Stripf et al. | 73/611 |
| 5,537,335 A * | 7/1996 | Antaki et al. | 702/100 |
| 5,650,943 A | 7/1997 | Powell et al. | 364/550 |
| 5,680,109 A | 10/1997 | Lowe et al. | 340/608 |
| 5,731,522 A | 3/1998 | Sittler | 73/708 |
| 5,756,898 A | 5/1998 | Diatschenko et al. | 73/592 |
| 5,854,993 A | 12/1998 | Grichnik | 702/54 |
| 5,854,994 A | 12/1998 | Canada et al. | 702/56 |
| 5,874,676 A | 2/1999 | Maki, Jr. | 73/579 |
| 5,912,499 A | 6/1999 | Diem et al. | 257/419 |
| 5,956,663 A | 9/1999 | Eryurek | 702/183 |
| 5,995,910 A | 11/1999 | Discenzo | 702/56 |
| 6,069,560 A | 5/2000 | Larsson | 340/540 |
| 6,119,047 A | 9/2000 | Eryurek et al. | 700/28 |
| 6,199,018 B1 | 3/2001 | Quist et al. | 702/34 |
| 6,260,004 B1 | 7/2001 | Hays et al. | 702/183 |
| 6,289,735 B1 | 9/2001 | Dister et al. | 73/579 |
| 6,367,328 B1 | 4/2002 | Gorman et al. | 73/592 |
| 6,370,879 B1 | 4/2002 | Stalder et al. | 60/725 |
| 6,378,364 B1 | 4/2002 | Pelletier et al. | 73/152.47 |
| 6,493,689 B2 | 12/2002 | Kotoulas et al. | 706/23 |
| 6,497,222 B2 | 12/2002 | Bolz et al. | 123/476 |
| 6,567,006 B1 | 5/2003 | Lander et al. | 340/605 |
| 6,584,847 B1 | 7/2003 | Hirose | 73/579 |
| 6,597,997 B2 | 7/2003 | Tingley | 702/56 |
| 6,601,005 B1 * | 7/2003 | Eryurek et al. | 702/104 |
| 6,727,812 B2 | 4/2004 | Sauler et al. | 340/511 |
| 6,751,560 B1 | 6/2004 | Tingley et al. | 702/51 |
| 6,904,476 B2 | 6/2005 | Hedtke | 710/72 |
| 6,920,789 B2 | 7/2005 | Sakai | 73/587 |
| 7,010,459 B2 | 3/2006 | Eryurek et al. | 702/182 |
| 7,040,179 B2 | 5/2006 | Drahm et al. | 73/861.356 |
| 7,099,852 B2 | 8/2006 | Unsworth et al. | 706/23 |
| 7,137,307 B2 | 11/2006 | Huybrechts et al. | 73/861.12 |
| 7,254,518 B2 | 8/2007 | Eryurek et al. | 702/183 |
| 7,258,024 B2 | 8/2007 | Dimarco et al. | 73/861.22 |
| 7,290,450 B2 | 11/2007 | Brown et al. | 73/579 |
| 7,321,846 B1 | 1/2008 | Huisenga et al. | 702/183 |
| 2002/0078752 A1 | 6/2002 | Braunling et al. | 73/627 |
| 2002/0145515 A1 | 10/2002 | Snowbarger et al. | 340/514 |
| 2004/0024568 A1 | 2/2004 | Eryurek et al. | 702/182 |
| 2004/0025593 A1 | 2/2004 | Hashimoto et al. | 73/643 |
| 2004/0093174 A1 | 5/2004 | Lander | 702/56 |
| 2005/0072239 A1 | 4/2005 | Longsdorf et al. | 73/649 |
| 2006/0277000 A1 | 12/2006 | Wehrs | 702/183 |

FOREIGN PATENT DOCUMENTS

| | | |
|---|---|---|
| DE | 35 03 597 C1 | 7/1986 |
| EP | 0 697 586 A2 | 2/1996 |
| JP | 3-118424 | 5/1991 |
| JP | 8-247076 | 9/1996 |
| JP | 2005-048638 | 2/2005 |
| RU | 2080647 | 5/1997 |
| RU | 2121105 | 10/1998 |
| SU | 901676 | 1/1982 |
| WO | WO2005/010522 | 2/2005 |

OTHER PUBLICATIONS

"Notification of Transmittal of the International Search Report and the Written Opinion" PCT/US2004/022736.

"Notification of Transmittal of the International Search Report" PCT/US00/14798.

Office Action from U.S. Appl. No. 11/439,095.

Notification of Transmittal of the International Search Report and Written Opinion for PCT/US2006/006899, filed Feb. 28, 2006.

"The Details of the First Office Action" from Chinese Application No. 2006-80005015.00 filed Feb. 28, 2006 dated Aug. 15, 2008; 5 pages.

"Invitation to Pay Additional Fees and Partial Search Report" for PCT/US2007/011428, dated Oct. 8, 2008.

"The Second Office Action" issued by the State Intellectual Property Office of People's Republic of China for related Chinese Application No. 20068005015.0; 8 pages.

The Federal Service for Intellectual Property, Patents and Trademarks "Decision on Grant Patent for Invention" for Russian patent application No. 2007135950/09(039303) filed Feb. 28, 2006; 14 pages (6 pages of Translation).

* cited by examiner

PROCESS CONNECTION FOR PROCESS DIAGNOSTICS

CROSS-REFERENCE TO RELATED APPLICATION

The present application is based on and claims the benefit of U.S. provisional patent application Ser. No. 60/656,994, filed Feb. 28, 2005, the content of which is hereby incorporated by reference in its entirety.

BACKGROUND OF THE INVENTION

The present invention relates to industrial process control and monitoring systems. More specifically, the present invention relates to diagnostics used in such systems.

Industrial process control and monitoring systems are used to monitor or control many types of industrial processes. For example, monitoring systems can be used to monitor the transfer of process fluids, such as oil, gasoline, etc., while industrial process control systems are used to control industrial processes. For example, a process transmitter such as a pressure transmitter can be configured to sense a process pressure and transmit information related to the sensed pressure to a remote location, such as a control room, over a two wire process control loop. The two wire process control loop is one example communication standard used in such systems. In a control system, in response to a sensed process variable (i.e., pressure), a controller can be configured to change operation of the process as desired such as, for example, controlling the position of a valve.

If a process device (a process variable transmitter or a process controller) fails or is otherwise not operating within its specifications, the process being controlled can be disrupted as well as the process control equipment. Various techniques have been used to identify or "diagnose" the condition of operation of the process. Such techniques can be used to provide an indication that a component has failed so that the process can be shut down and service personnel can replace the component. Additionally, in some configurations, the diagnostic techniques attempt to identify a failing component prior to that components ultimate failure thereby allowing preventive maintenance to be performed.

Some techniques used to diagnose process control and monitoring systems utilize process noise. Process noise is the higher frequency variation of pressure signal due to equipment and general fluid flow. One process noise example might be the high frequency pressure variation generated by flow through an orifice plate, or a turbine pump. The process noise can be monitored and used to identify a failing or failed component in the process control and monitoring system. Such techniques are described, for example, in U.S. Pat. No. 6,601,005 entitled "PROCESS DEVICE DIAGNOSTICS USING PROCESS VARIABLE SENSOR SIGNAL", issued Jul. 29, 2003, and assigned to Rosemount Inc.

SUMMARY OF THE INVENTION

A process coupling for coupling a diagnostic device to process fluid of an industrial process includes a process interface configured to physically couple to the process fluid. A fluid pathway extending from the process interface couples the process interface element of the process device to the process fluid. The fluid pathway is configured to improve transmission of process noise from the process fluid to the process device.

DETAILED DESCRIPTION OF ILLUSTRATIVE EMBODIMENTS

The present invention provides techniques for coupling process devices to industrial process fluids in a manner which improves the devices' sensitivity to process noise or a subset of interest, in order to enhance the diagnostic capabilities of the device. This may include amplification and/or suppression of all or part of the process noise signal.

Figure 1:
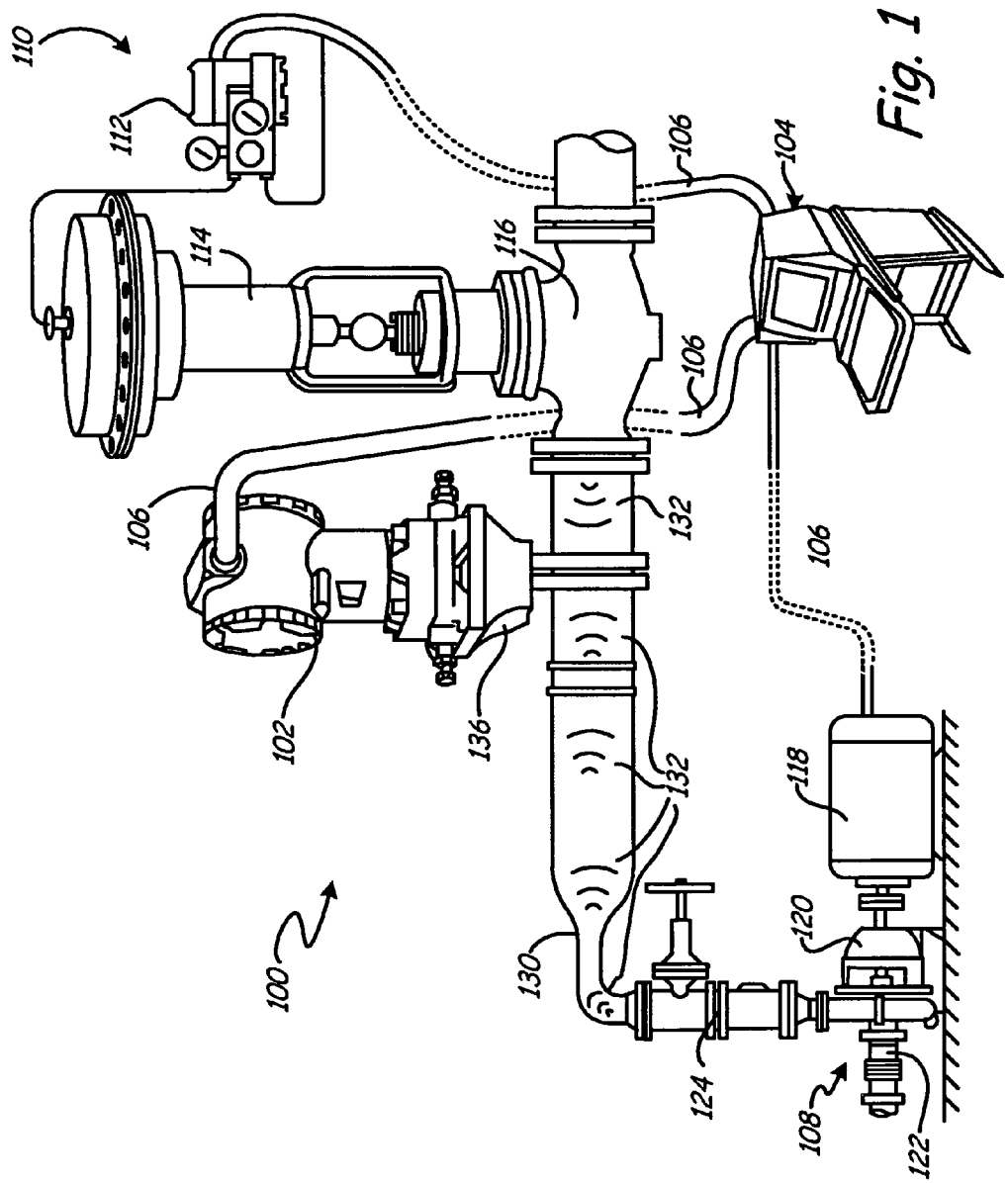
FIG. 1 is an example diagram of a process control system including a process coupling in accordance with the present invention.

In FIG. 1, a typical environment for a diagnostic device 102 in accordance with one embodiment of the invention is illustrated at 100. In FIG. 1, diagnostic device 102, such as a process transmitter 102 configured as a pressure transmitter, is shown connected to control system 104. Process transmitters can be configured to monitor one or more process variables associated with fluids in a process plant such as slurries, liquids, vapors and gasses in chemical, pulp, petroleum, gas, pharmaceutical; food and other fluid processing plants. The monitored process variables can be pressure, flow, level, temperature or other properties of fluids. A process noise sensitive process variable sensor is one that can sense process noise carried in the process fluid, such as a pressure sensor, a sensor in a coriolis flow meter, electrodes in a magnetic flow meter, a sensor in a vortex or ultrasonic flowmeter or others. Process transmitters include one or more sensors that can be either internal to the transmitter or external to the transmitter, depending on the installation needs at the process plant. Process transmitters generate one or more transmitter outputs that represent a sensed process variable or can also monitor the process using data received from remote sensors. Transmitter outputs are configured for transmission over long distance to a controller or indicator via communication bus 106. In typical fluid processing plants, communication bus 106 can be a 4-20 mA current loop that powers the transmitter, or a fieldbus connection, a HART® protocol communication or a fiberoptic connection to a controller, a wireless communication link, a control system or an output device. In transmitters powered by a two wire loop, power must be kept low to provide intrinsic safety in explosive atmospheres. Other types of communication busses can also be used such as either net operating with other protocols such as tcp/ip including wired and wireless techniques.

In FIG. 1, pump control device 108 and valve control device 110 are illustrated as examples of control devices and vibration noise sources. Control devices are actuated by control system 104 using communication bus 106 to control the process fluid. System 104 can be a maintenance computer, an enterprise planning or monitoring system or a computerized maintenance measurement system or a process control system. Control devices are also typically vibration noise sources. However, a vibration noise source is any element in a process which generates vibrations which are carried by process fluid. Vibration noise signals are any vibration signal generated by a control device or which are generated by process fluid moving through the process system, such as vibrations due to cavitation or other flow or process related noise. Valve control device 110 includes a valve controller 112 which controls a supply of pressurized air to valve actuator 114 which in turn actuates valve 116. Pump control device includes motor 118 which actuates pump 120 to move process fluid through suction flange pipeline 122 and out discharge valve 124. Control devices and transmitters all couple to process piping 130 which carries process fluid. Vibration noise signals 132 generated by the process such as by operation of control devices, propagate through the process fluid and are sensed by a process variable sensor. A diagnostic device includes a process noise sensor to sense the process noise for use in diagnostics. The process noise sensor can be a dedicated sensor or can be a process variable sensor using techniques such as those discussed in U.S. Pat. No. 6,601,005 entitled "PROCESS DEVICE DIAGNOSTICS USING PROCESS VARIABLE SENSOR SIGNAL" which issued Jul. 29, 2003 and assigned to Rosemount Inc. and which is incorporated herein by reference in its entirety.

FIG. 1 illustrates a process coupling 136 in accordance with the present invention. Process coupling 136 can be of any shape and configuration and the particular shape shown in FIG. 1 is for illustrative purposes only. Coupling 136 is configured to optimize the coupling of process noise signals 132 to the sensor carried in transmitter 102. Example improvements to such a noise signal include increasing the amplitude, changing the frequency profile, filtering out certain frequencies, etc.

Process coupling 136 provides a process fluid pathway which is configured to optimize, such as by enhancing, transmission of process noise from the process fluid to the process device. Process coupling 136 can use any appropriate technique to enhance the coupling of vibration signal to the process variable sensor. Preferably, the connections within coupling 136 which carry the process fluid to the process variable sensor are enhanced to improve the diagnostic capabilities of the transmitter 102.

Figure 2:
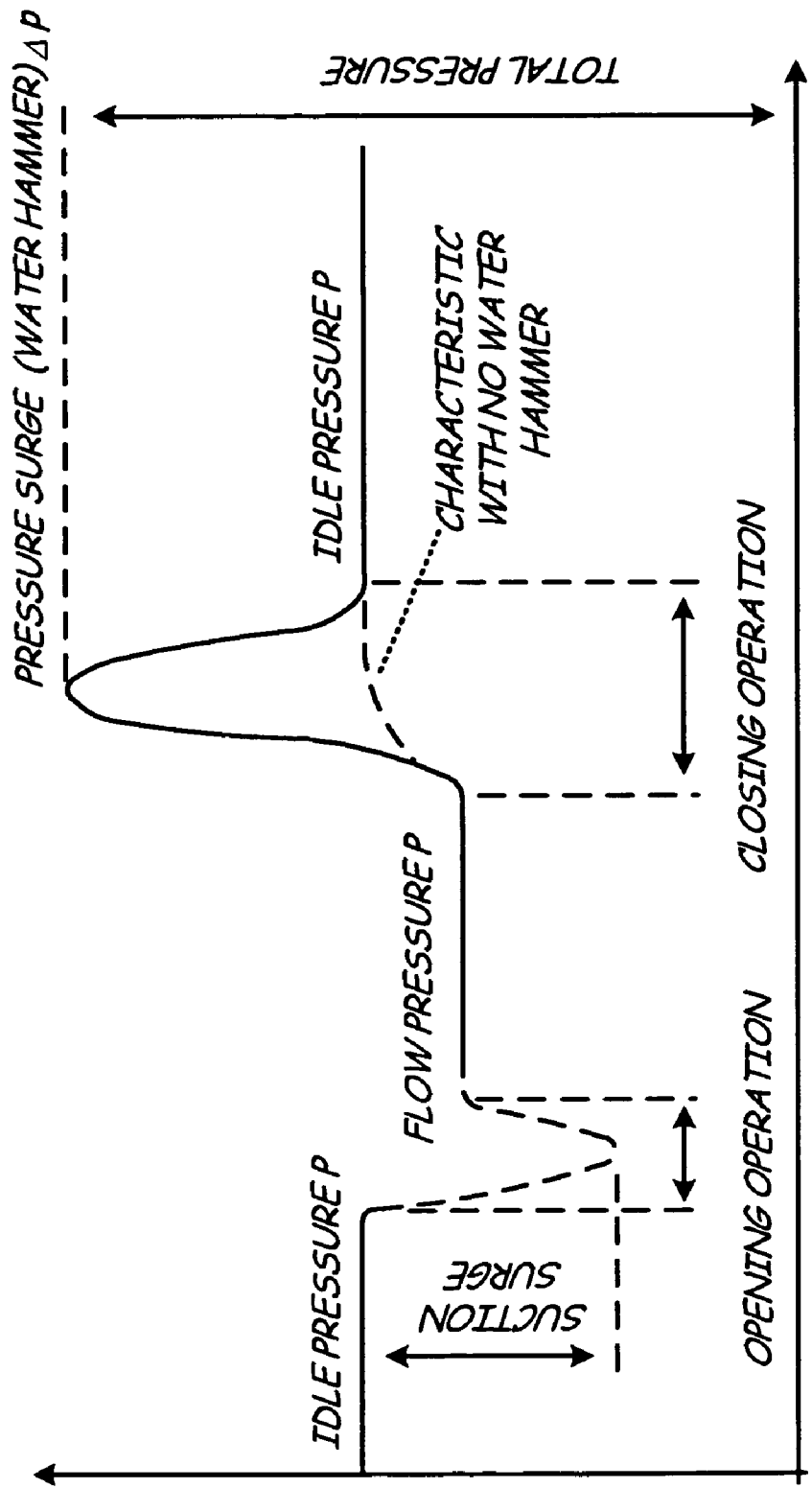
FIG. 2 is a graph illustrating a "water hammer" effect.

For example, one pathway which can be configured to enhance noise can use techniques which are generally known as "pressure piling." In one example of pressure piling, an ignition of a flammable-material in a confined pipe or the like creates a flame front. This generates a pressure wave that starts traveling in the direction of combustible material. The combusted material expands rapidly causing a jet effect and driving the combustion to higher speeds and higher pressures. The flame front transitions through an explosion, to overdriven detonation reaching its peak pressure and speed. It then stabilizes and continues to travel through the pipe system as a stable detonation. Thus, a small, relatively low energy ignition can be transformed within a very short distance and time into an enormous explosion. Another example of pressure piling is known as the water "hammer" phenomenon. For example, in a pipe carrying a flowing fluid, if a valve is suddenly closed the fluid column is abruptly decelerated to zero velocity. This produces a pressure wave which passes through the fluid in a direction against the flow and which travels at the speed of sound in the fluid. The pressure wave is then reflected back to the valve. At the valve, the pressure wave is reflected back again in the reverse direction. The reflections, when properly timed can amplify the signal. This process repeats until the wave dissipates. This type of pressure piling is referred as a pressure surge or a water hammer. It can be many times the operating pressure and can lead to bothersome noises and excessive stress on the piping system. FIG. 2 is a graph showing water pressure versus time during a pressure surge (water hammer) type event. When the valve is closed, the graph shown in FIG. 2 illustrates the large overpressure occurrence.

Another example of a pathway which is configured to enhance noise is one which amplifies the sound. For example, a cup or horn shape configuration similar to the human ear. Such a configuration focuses sound over a large area down to a relatively small area, thereby increasing the amplitude. Further, by properly shaping the pathway, various frequencies can be attenuated or amplified as desired.

Another example of a configuration which enhances transmission of process noise is similar to the operation of the human eardrum. The eardrum is composed of a number of components which are arranged to amplify sound. When the Malleus of the ear is moved by the eardrum, it moves side to side like a lever. The opposing end of the Malleus is connected to the Incus which is attached to the Stapes. The Stapes acts as a piston, creating waves in the inner ear fluid to represent the ear pressure fluctuations of the sound wave. The amplification comes from the size difference between the eardrum and the stirrup. Further, the Malleus is longer the Incus, forming a basic lever between the eardrum and the Stapes. The Malleus moves a greater distance while the Incus moves with greater force. Overall, the pressure applied to the Cochlear fluid of the ear is about twenty-two times the pressure received at the eardrum itself. Any of the amplification techniques can be implemented in the process fluid pathway of coupling 136 to amplify or otherwise enhance the transmission of process noise from the process fluid to the process device for use in diagnostics. Similarly, such techniques can be used to attenuate unwanted noise information.

Figure 3:
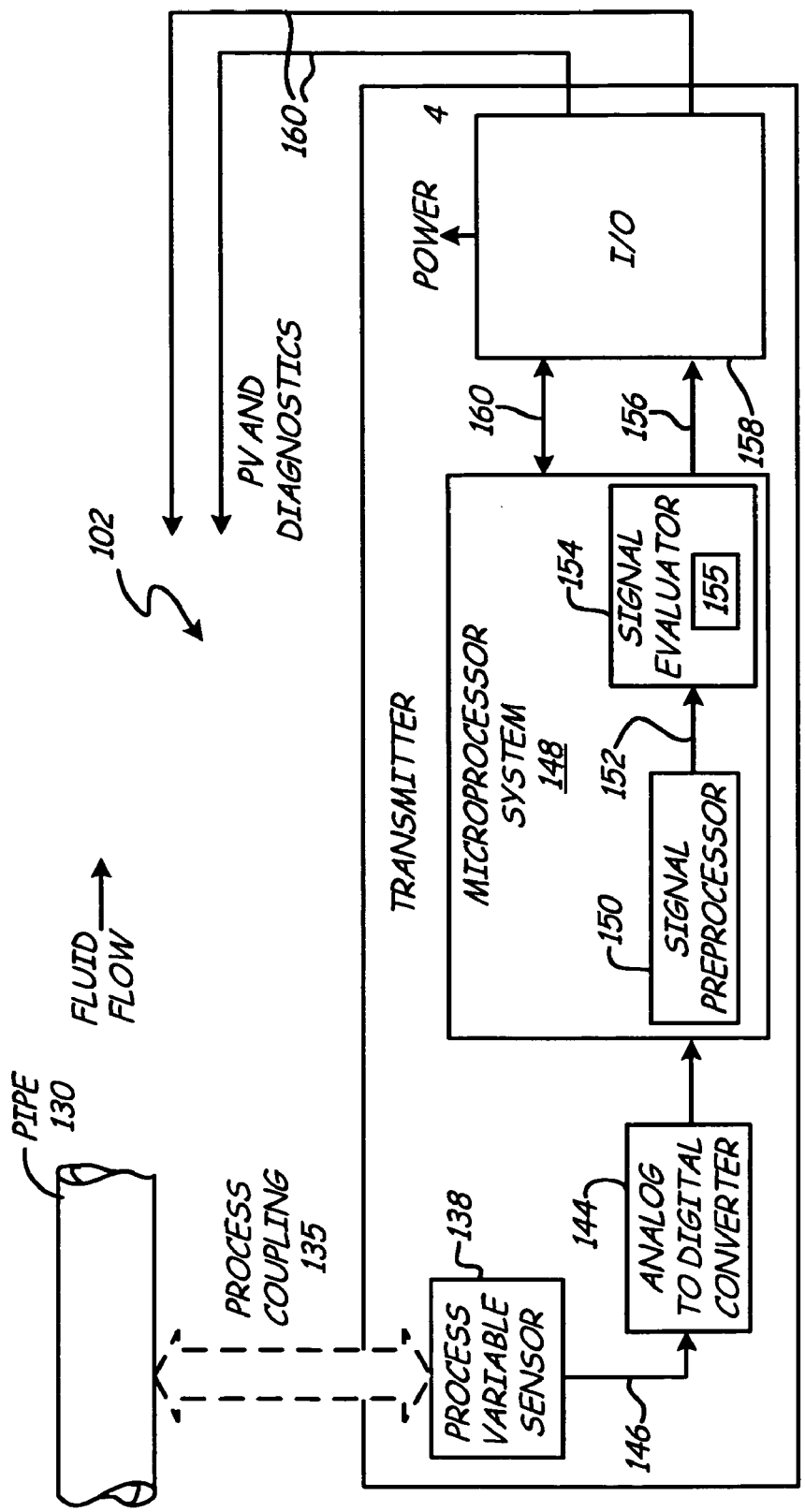
FIG. 3 is a block diagram of a diagnostic device including a process coupling of the invention.

In FIG. 3, a block diagram showing one embodiment of a transmitter 102 configured as a diagnostic device in accordance with the invention. Examples of other diagnostic devices include control system 104, magnetic flowmeters, vortex flowmeters, coriolis flowmeters, and process control devices such as valve control device 110. Transmitter 102 senses a process variable of process fluid in pipe 130 with process variable sensor 138. Sensor 138 can be a process variable sensor or can be a dedicated sensor used only for diagnostics. Transmitter 102 includes the process coupling 136 which couples a process variable sensor 138 to process fluid in pipe 130. For example, coupling 136 can comprise any configuration to enhance or alter the process noise or other process vibrations which are coupled to the process variable sensor 138. Although process coupling 136 is shown as coupling to a process variable sensor, sensor 138 can also comprise a dedicated diagnostic sensor 138. Analog to digital converter 144 receives sensor output 146 from process variable sensor 138 which is related to a process variable of the process fluid and to the noise signal 132. Analog to digital converter 144 provides a digitized sensor signal to microprocessor system 148.

Microprocessor system 148 includes signal preprocessor 150 which is coupled to sensor output 146 through analog to digital converter 144 and isolates signal components from the noise signal 132 such as frequencies, amplitudes or signal characteristics which are related to operation of the process. Signal preprocessor 150 provides an isolated signal output 152 to signal evaluator 154. Signal preprocessor isolates a portion of the process variable signal by filtering, performing a wavelet transform, performing a Fourier transform, use of a neural network, statistical analysis, or other signal evaluation techniques. The isolated signal output is related to vibration noise signals 132 in the process fluid sensed by sensor 138. Signal evaluator 154 includes memory 155 and provides a condition output 156 which is related to a condition of the process including of the process device itself, such as a plugged line. Signal evaluator 154 evaluates the isolated signal output 152 based upon a rule, fuzzy logic, a neural network, an expert system, a wavelet analysis or other signal evaluation technique. The invention is not limited to the techniques enumerated herein. Process conditions include condition, diagnostic, health, or time to failure information related to valves, pumps, pump seals, discharge systems, actuators, solenoids, compressors, turbines, agitators, dampers, piping, fixtures, tanks, transmitters, sensors, or other components of a process control system. The conditioned output is provided to input/output circuitry 158 which is used to communicating to two-wire process control loop 106. In some configurations, I/O circuitry 158 is also used to provide power for operation of a process device using power completely generated from the process control loop 106. I/O circuitry 158 is also used for sending and/or receiving other data 160 over process control loop 106. For example, if the device is configured as a transmitter, process variable information can be transmitted over loop 106.

The sensor 138 can be any type of sensor which is capable of sensing vibrations in the process fluid. The sensor 138 should have a bandwidth and a frequency response or resolution sufficient to detect the desired vibration noise signals. Typically, this is between about 0 and about 200 Hz when implemented in a differential pressure sensor of a differential pressure based flow transmitter. A process variable pressure sensor having sufficient bandwidth is illustrated in U.S. Pat. No. 5,637,802, issued Jun. 10, 1997. Other components in the device such as analog to digital converters, amplifiers and other elements in the input channel should also have sufficient bandwidth. Other types of process variable sensors include an ultrasonic or radio frequency receiver in a level gauge or an ultrasonic receiver in an ultrasonic level sensor. For example, transmitter 102 can comprise an ultrasonic flowmeter or level gauge and sensor 138 is an ultrasonic sensor. Additionally, control devices such as valve controllers can include process variable sensors.

The particular configuration of the process coupling 136 can be determined using modeling techniques or using empirical analysis. For example, optimal pipe diameters, elbows, shapes, etc., can be used to reduce the attenuation of diagnostic noise. Techniques can be used to "catch" noise such as using megaphone type configurations in which noise is funneled to a sensor. A large secondary diaphragm can be used to amplify the noise. The amplification is due to the size difference between the amplifying diaphragm and a second diaphragm, for example an isolation diaphragm used to isolate the sensor. Specific noise frequencies can be passed through the coupling using a closed resonator type arrangement similar to a pipe organ. In such a configuration, a chamber is sized to resonate at the frequency of interest, in effect amplifying the signal. In an active system, the coupling can be actively tuned for optimum performance.

A vibration sensitive process variable sensor is one that can sense vibrations carried in the process fluid, such as a pressure sensor, a sensor in a coriolis flow meter, electrodes in a magnetic flow meter, a sensor in a vortex or ultrasonic flowmeter or others.

Figure 4:
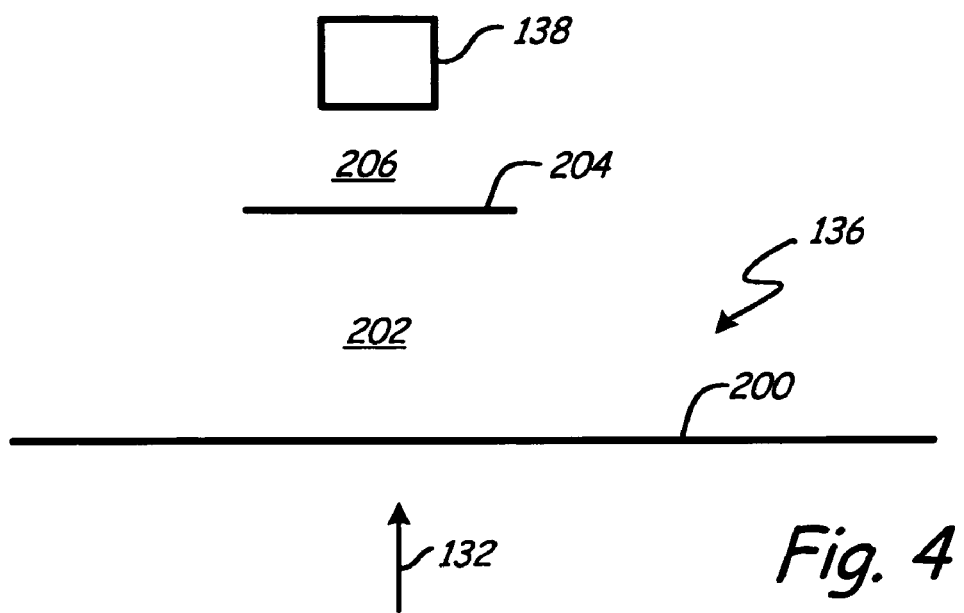
FIG. 4 is diagram showing one configuration of the process coupling to amplify process noise signals.

FIG. 4 is a simplified diagram of one configuration of process coupling 136 having a fluid pathway in which a large diaphragm 200 receives process vibration 132. An isolation fluid 202 carries the process vibrations to a smaller diaphragm 204. Finally, the vibrations are transferred to sensor 138 through additional isolation fluid 206. Such a configuration amplifies the vibration signal 132 due to the size difference between diaphragm 200 and 204.

Figure 5:
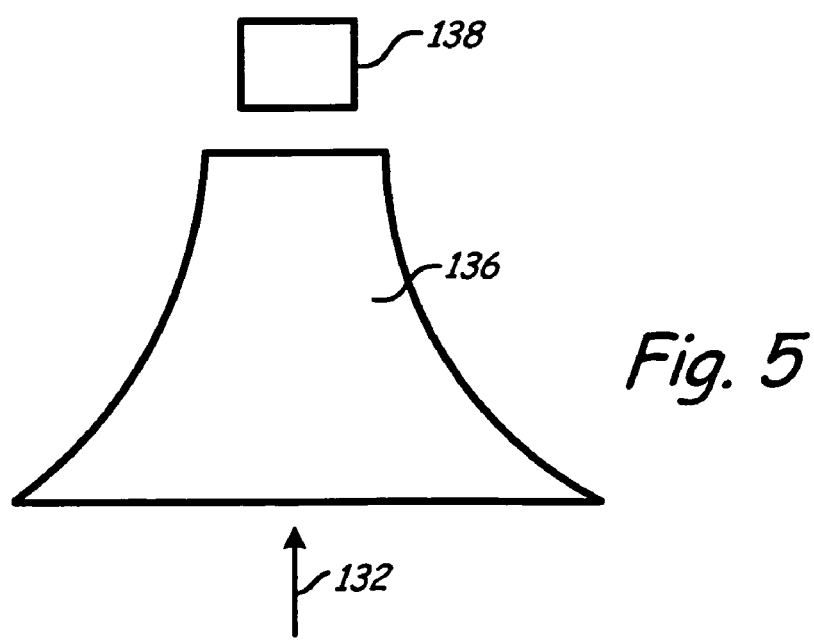
FIG. 5 is a simplified diagram showing another configuration of process coupling configured to amplify noise signals.

FIG. 5 shows a configuration having a fluid pathway in which process coupling 136 has a horn shape such that the vibration signal 136 is received across a large area and is funneled down to a relatively small areas before being applied to sensor 138. This also provides amplification to the process fluid. Another example configuration uses various passages, bends, and shape changes to amplify and/or attenuate certain frequencies. All of the process couplings include a process interface which physically couples to the process fluid, either directly or indirectly, and a pathway which extends from the process interface to a process noise signal sensor. The fluid pathway is configured to optimize transmission of the process noise signal from the process fluid to the sensor.

Figure 6:
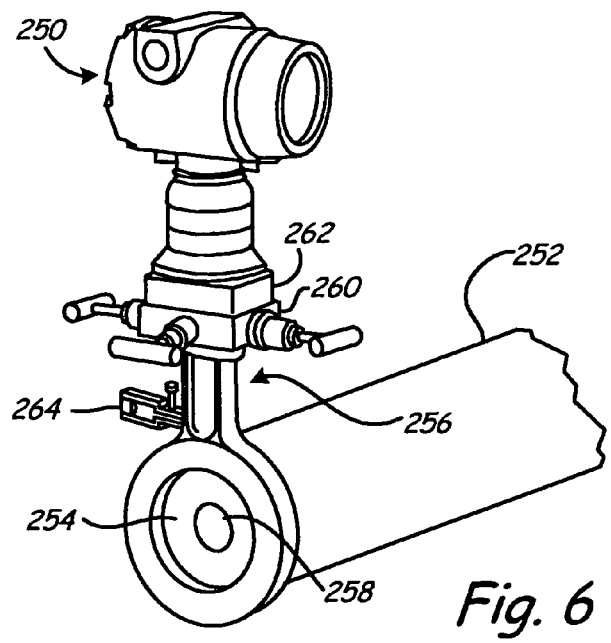
FIG. 6 is a perspective view of a field device coupled to an industrial process including a noise coupling element in the fluid pathway which extends between the process fluid and the field device.

FIG. 6 is a perspective view of an example embodiment of the present invention in which a process device 250 couples to process piping 252. Process device 250 is a process variable transmitter arranged to measure flow of process fluid due to a differential pressure generated across a primary element 254 which comprises an orifice plate. The process coupling 256 extends between the process interface 258 and the process device 250. The process interface 258 comprises two pressure taps arranged to measure a differential pressure. Process coupling 256 includes a fluid pathway (270 shown in FIG. 7) which extends between the process coupling 258 and the field device 250. A flange 260 of coupling 256 is arranged to mount to a flange 262 of the field device 250. During operation, a differential pressure is generated across orifice plate 254 as the process fluid moves through process piping 252. This differential pressure is measured using a process variable sensor in field device 250 and is indicative of the flow rate.

Figure 7:
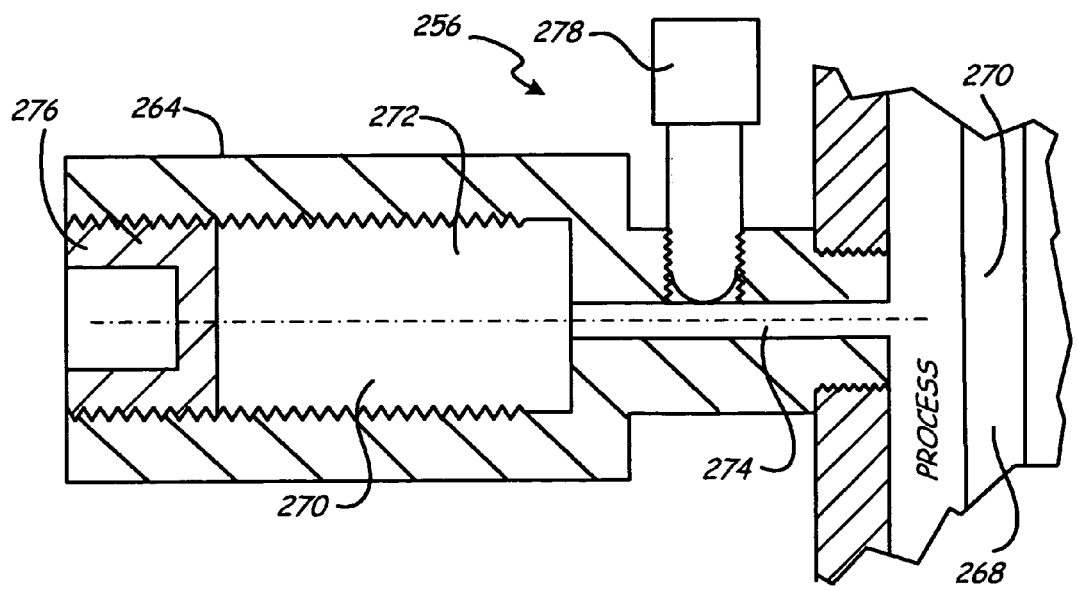
FIG. 7 is a cross sectional view of the fluid pathway showing an adjustable volume and a main passageway.

FIG. 6 also illustrates a noise coupling 264 which is a part of coupling 256 and illustrated in FIG. 7 in greater detail. Noise coupling 264 improves the coupling of the process noise signal to the process variable sensor in the process device 250.

FIG. 7 is a cross sectional view of coupling 256 which illustrates fluid pathway 270 and noise coupling 264. Pathway 270 includes a main passageway 268 which extends between process interface 258 and the field device. Noise coupling 264 alters the shape of fluid pathway 270 and provides an additional internal volume 272. Volume 272 couples to the process fluid through passageway 274 such that volume 272 and passageway 274 all form part of fluid pathway 270.

Noise coupling 264 is arranged as a Helmholtz resonator having an adjustable volume 272. The volume 272 can be adjusted by turning threaded plug 276. Additionally, a screw 278 is arranged to selectively block passage 274 thereby adjustably restricting the coupling between volume 272 and the process. Main passageway 268, adjustable volume 272 and pathway 274 all form part of the fluid pathway 270 which extends between the process interface 258 and the field device 250. Using this configuration, the manner in which the fluid pathway alters transmission of the process noise signal from the process fluid to the process sensor can be adjusted as desired for a particular installation by adjusting the position of plug 276 and screw 278.

In typical prior art configurations, techniques are used to prevent or attenuate the process noise signal. In contrast, the present invention alters the transmission of process noise in a manner which enhances diagnostic capabilities of the device. In general, the present invention improves the transmission of process noise as desired by altering the amplification, attenuation, filtering, or other characteristics of the process noise signal. Any appropriate technique can be employed to perform this alternation of the noise signal such as those discussed herein including accumulators, resonators, silencers, suppressors, etc. In some configurations, the characteristics of the fluid pathway are adjustable such that the transmission of the process noise signal can be altered as desired for particular installation. By allowing the modification of the process coupling size and/or shape during commission of the device, the coupling can be further optimized for a specific installation. Examples include the ability to maximize or otherwise increase amplification, focus or emphasize a specific frequency or set of frequencies, etc. Such adjustments can be accomplished by allowing the coupling geometry to be modified by an operator in situ. Another example of a coupling is through the use of flexible tubing. Such tubing will move as a Bourden tube thereby absorbing some of the energy from the process noise signal. A little more rigid tubing can be used to enhance noise transmission. For example, the passageway 268 illustrated in FIG. 7 can comprise an opening drilled through a solid casting. Such a configuration transmits additional noise through the coupling than if a separate tube is employed.

Although the present invention has been described with reference to preferred embodiments, workers skilled in the art will recognize that changes may be made in form and detail without departing from the spirit and scope of the invention.

What is claimed is:

1. A process device for diagnosing operation of an industrial process or process device, comprising:
    diagnostic circuitry configured to diagnose operation of the industrial process or process device based upon a process noise signal sensed by a sensor configured to sense the process noise signal;
    a process coupling for coupling the process device to process fluid of an industrial process, comprising:
        a process interface configured to physically couple to the process fluid and having an opening which opens to the process fluid;
        a fluid pathway extending from the opening of the process interface to the sensor and which terminates at the sensor, the fluid pathway configured to couple the sensor of the process device to the process fluid; and
        wherein the fluid pathway is configured to amplify at least a portion of the process noise signal from the process fluid to the sensor.

2. The apparatus of claim 1 wherein the process coupling includes a first and second diaphragm of differing sizes.

3. The apparatus of claim 1 wherein the process coupling includes a horn type configuration.

4. The apparatus of claim 1 wherein the process coupling is configured to attenuate certain frequencies of process noise.

5. The apparatus of claim 1 wherein the sensor comprises a process variable sensor configured to receive the process noise signal.

6. The apparatus of claim 1 wherein the process device comprises a process variable transmitter.

7. The apparatus of claim 1 wherein the process device comprises a process variable controller.

8. The apparatus of claim 1 including I/O circuitry for a two-wire process control loop.

9. The apparatus of claim 8 wherein the process device is powered with power received from the two-wire process control loop.

10. The process device of claim 1 wherein the fluid pathway includes a volume arranged as a Helmholtz resonator.

11. The apparatus of claim 1 wherein the fluid pathway is adjustable whereby alterations in the transmission of the process noise signal from the process fluid to the sensor is thereby adjustable.

12. The apparatus of claim 1 wherein the fluid pathway comprises a Helmholtz resonator having an adjustable volume.

13. The apparatus of claim 1 including an adjustable blocking element arranged to selectively block the fluid pathway.

14. A method for diagnosing operation of an industrial process or process device, comprising:
    coupling a field device to the industrial process with a process coupling having an opening which opens to a process fluid;
    receiving a process noise signal from the process fluid with the opening of the process coupling and coupling the process noise signal to a sensor of the field device, wherein the coupling includes a fluid pathway from the opening to the sensor which terminates at the sensor;
    altering the process noise signal by amplifying at least a portion of the process noise signal with a physical configuration of the process coupling;
    sensing the altered process noise signal with the sensor of the field device; and
    diagnosing operations of the process or process device based upon the sensed altered process noise signal.

15. The method of claim 14 wherein the process coupling includes a first and second diaphragm of differing sizes.

16. The method of claim 14 wherein the process coupling includes a horn type configuration.

17. The method of claim 14 including amplifying the process noise signal with a lever.

18. The method of claim 14 includes attenuating certain frequencies of process noise.

19. The method of claim 14 wherein the process device comprises a process variable transmitter.

20. The method of claim 14 wherein the process device comprises a process variable controller.

21. The method of claim 14 including a coupling to a two-wire process control loop.

22. The method of claim 21 including powering the process device with power received from the two-wire process control loop.

23. The method of claim 14 wherein the process coupling includes a volume arranged as a Helmholtz resonator.

24. The method of claim 14 including adjusting a physical configuration of the process coupling whereby selectively adjusting alterations in the process noise signal by the process coupling.

25. The method of claim 14 wherein the process coupling comprises a Helmholtz resonator and the method includes adjusting a volume of the Helmholtz resonator.

26. The method of claim 14 including selectively blocking the fluid pathway.

* * * * *